United States Patent
Fukushi et al.

(10) Patent No.: US 10,335,771 B2
(45) Date of Patent: *Jul. 2, 2019

(54) AQUEOUS DISPERSION AND COATING MATERIAL USING THE SAME, AND PHOTOCATALYTIC FILM AND PRODUCT

(71) Applicants: Kabushiki Kaisha Toshiba, Tokyo (JP); Toshiba Materials Co., Ltd., Yokohama-Shi (JP)

(72) Inventors: Daisuke Fukushi, Yokohama (JP); Takao Kusaka, Yokohama (JP); Akira Sato, Yokohama (JP); Kayo Nakano, Yokohama (JP); Akihisa Nitsuta, Yokohama (JP); Yukiko Inui, Yokosuka (JP); Hiroyasu Oota, Shinagawa-Ku (JP)

(73) Assignees: Kabushiki Kaisha Toshiba, Minato-Ku (JP); Toshiba Materials Co., Ltd., Yokohama-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/001,167

(22) Filed: Jun. 6, 2018

(65) Prior Publication Data

US 2018/0290127 A1    Oct. 11, 2018

Related U.S. Application Data

(63) Continuation of application No. 14/200,352, filed on Mar. 7, 2014, now Pat. No. 10,010,869, which is a
(Continued)

(30) Foreign Application Priority Data

Jun. 1, 2012    (JP) ................................ 2012-126577

(51) Int. Cl.
    *B01J 23/30*    (2006.01)
    *C09D 1/00*    (2006.01)
    (Continued)

(52) U.S. Cl.
    CPC .............. *B01J 23/30* (2013.01); *B01J 21/066* (2013.01); *B01J 23/888* (2013.01);
    (Continued)

(58) Field of Classification Search
    None
    See application file for complete search history.

(56) References Cited

U.S. PATENT DOCUMENTS 8,273,169 B2 *    9/2012    Nakano ................... A61L 2/232
                                                                106/287.18
2009/0305878 A1    12/2009    Sakatani et al.
(Continued)

FOREIGN PATENT DOCUMENTS

JP    2000-218161 A1    8/2000
JP    2002-293667 A1    10/2002
(Continued)

OTHER PUBLICATIONS

Zhao et al, two-phase synthesis of shape controlled colloidal zirconia nanocrystals and their characterization, j. am. chem, soc, 128 , 10118-10124 (Year: 2006).*
(Continued)

*Primary Examiner* — Melvin C. Mayes
*Assistant Examiner* — Stefanie J Cohen
(74) *Attorney, Agent, or Firm* — Burr & Brown, PLLC (57) ABSTRACT

An aqueous dispersion of an embodiment includes visible-light responsive photocatalytic composite microparticles containing tungsten oxide and zirconium oxide, and an aqueous dispersion medium in which the photocatalytic composite microparticles are dispersed. In the photocatalytic
(Continued)

composite microparticles, a ratio of a mass of the zirconium oxide to a mass of the tungsten oxide is in a range of from 0.05% to 200%, and a D50 particle size in particle size distribution is in a range of from 20 nm to 10 μm. The aqueous dispersion has pH in a range of from 1 to 9.

17 Claims, 1 Drawing Sheet

Related U.S. Application Data continuation of application No. PCT/JP2013/003468, filed on May 31, 2013.

(51) Int. Cl.
| | | |
|---|---|---|
| *B01J 21/06* | (2006.01) | |
| *B01J 23/888* | (2006.01) | |
| *B01J 23/89* | (2006.01) | |
| *B01J 35/00* | (2006.01) | |
| *B01J 35/02* | (2006.01) | |
| *B01J 35/10* | (2006.01) | |
| *C09D 7/40* | (2018.01) | |

(52) U.S. Cl.
CPC ......... *B01J 23/8993* (2013.01); *B01J 35/004* (2013.01); *B01J 35/0013* (2013.01); *B01J 35/023* (2013.01); *B01J 35/1014* (2013.01); *C09D 1/00* (2013.01); *C09D 7/70* (2018.01); *B01J 21/063* (2013.01)

(56) References Cited

U.S. PATENT DOCUMENTS

| | | |
|---|---|---|
| 2011/0212832 A1 | 9/2011 | Nakano et al. |
| 2012/0316056 A1 | 12/2012 | Nakano et al. |
| 2013/0224096 A1* | 8/2013 | Fujii ................. B01J 21/063 |
| | | 423/239.1 |

FOREIGN PATENT DOCUMENTS

| | | |
|---|---|---|
| JP | 2008-018650 A1 | 1/2008 |
| JP | 2009-106897 A1 | 5/2009 |
| JP | 2009-233655 A1 | 10/2009 |
| JP | 2009-270040 A1 | 11/2009 |
| JP | 2010-120805 A1 | 6/2010 |
| JP | 2010-270094 A1 | 12/2010 |
| JP | 2015-006987 A1 | 1/2015 |
| JP | 5835219 B2 | 12/2015 |
| WO | 2009/110234 A1 | 9/2009 |
| WO | 2012/014877 A1 | 2/2012 |
| WO | WO-2012014877 A1 * | 2/2012 ............ B01J 21/063 |

OTHER PUBLICATIONS

International Search Report and Written Opinion dated Aug. 7, 2013 (with English translation).
International Preliminary Report on Patentability (Application No. PCT/JP2013/003468) dated Dec. 2, 2014.
Japanese Notice of Allowance (Application No. 2016-007881) dated Jan. 10, 2017 (with English translation).
Zhao et al., "Two-Phase Synthesis of Shape-Controlled Colloidal Zirconia Nanocrystals and Their Characterization," *Journal of the American Chemical Society*, vol. 128, Jul. 2006, pp. 10118-10124.

* cited by examiner

AQUEOUS DISPERSION AND COATING MATERIAL USING THE SAME, AND PHOTOCATALYTIC FILM AND PRODUCT

CROSS REFERENCE TO RELATED APPLICATION

This application is a continuation of U.S. application Ser. No. 14/200,352, filed Mar. 7, 2014, now U.S. Pat. No. 1,010,869, which in turn is a continuation of International Application No. PCT/JP2013/003468, filed May 31, 2013, which designated the United States, and claims the benefit under 35 USC § 119 (a)-(d) of Japanese Application No. 2012-126577, filed Jun. 1, 2012, the entireties of which are incorporated herein by reference.

FIELD OF THE INVENTION

Embodiments described herein relate generally to an aqueous dispersion and a coating material using the same, and a photocatalytic film and a product.

BACKGROUND OF THE INVENTION

A tungsten oxide thin film is widely used as a dielectric material used in capacitors, filters, electronic devices such as semiconductor chips, and the like, as an optical element material used in optical communication filters, isolators, and the like, as an electrochromic material used in light control mirrors and the like, and as a gaschromic material used in gas sensors and the like. It is also known that tungsten oxide functions as a visible-light responsive photocatalytic material, and it is a material drawing great attention in view of industrial applicability. Further, tungsten oxide microparticles have an excellent function as a visible-light responsive photocatalyst, and a film containing the tungsten oxide microparticles are drawing attention.

A photocatalytic film using tungsten oxide is formed by, for example, applying a dispersion containing tungsten oxide microparticles on a surface of a base material of a product to which photocatalytic performance is to be imparted. It is known an aqueous dispersion which contains tungsten oxide microparticles having an average primary particle size (D50 particle size) in a range of from 1 to 400 nm and whose pH is in a range of from 1.5 to 6.5. According to such an aqueous dispersion, dispersibility of the tungsten oxide microparticles is enhanced and formability of a film containing the tungsten oxide microparticles is improved. Therefore, when the film which is formed by applying the aqueous dispersion containing the tungsten oxide microparticles on the base material is used as a photocatalytic film, visible-light responsive catalytic performance of the tungsten oxide microparticles can be exhibited.

A conventional photocatalytic film containing tungsten oxide microparticles exhibits a 5% gas decomposition rate or more under an environment where illuminance of visible light is about 2000lx. However, considering practicality of the photocatalytic film, decomposition performance for harmful gas such as acetaldehyde is not sufficient, which has given rise to a demand for improvement of the gas decomposition performance. Further, being poor in gas adsorbing power, the conventional photocatalytic film has a problem that its gas decomposition speed becomes low under an environment with a low gas concentration. Such circumstances have given rise to a demand for an increase of the gas decomposition performance by a visible-light responsive photocatalyst.

DETAILED DESCRIPTION OF THE INVENTION

According to one embodiment, there is provided an aqueous dispersion of an embodiment including: visible-light responsive photocatalytic composite microparticles containing tungsten oxide and zirconium oxide; and an aqueous dispersion medium in which the photocatalytic composite microparticles are dispersed. In the photocatalytic composite microparticles, a ratio of a mass of the zirconium oxide to a mass of the tungsten oxide is in a range of from 0.05% to 200%, and a D50 particle size in particle size distribution is in a range of from 20 nm to 10 µm. The aqueous dispersion has pH in a range of from 1 to 9.

Hereinafter, an aqueous dispersion of an embodiment and a coating material using the same, and a photocatalytic film and a product will be described. The aqueous dispersion of the embodiment includes: visible-light responsive photocatalytic composite microparticles containing tungsten oxide and zirconium oxide; and an aqueous dispersion medium in which the photocatalytic composite microparticles are dispersed. pH of the aqueous dispersion of the embodiment is in a range of not less than 1 nor more than 9. As the aqueous dispersion medium, at least one selected from water and alcohol is exemplified.

In the photocatalytic composite microparticles of the aqueous dispersion of the embodiment, a ratio of a mass of the zirconium oxide to a mass of the tungsten oxide is in a range of not less than 0.05% nor more than 200%, and a D50 particle size in particle size distribution is in a range of not less than 20 nm nor more than 10 µm. In the photocatalytic composite microparticles, the ratio of the mass of the zirconium oxide to the mass of the tungsten oxide is more preferably in a range of not less than 0.1% nor more than 150%.

In photocatalytic composite microparticles of an aqueous dispersion of another embodiment, a ratio of atomicity of zirconium to atomicity of tungsten is in a range of not less than 0.05% nor more than 400%, and a D50 particle size in particle size distribution is in a range of not less than 20 nm nor more than 10 µm. In the photocatalytic composite microparticles, the ratio of the atomicity of the zirconium to the atomicity of the tungsten is more preferably in a range of not less than 0.1% nor more than 300%.

Tungsten oxide exhibits photocatalytic performance such as gas decomposition under visible light irradiation. However, it has been found out that a gas decomposition speed by tungsten oxide decreases as a gas concentration reduces from an initial gas concentration. This is thought to be because tungsten oxide has low decomposition performance for an intermediate generated when gas is decomposed, and tungsten oxide has low gas adsorption power under an environment with a low gas concentration. The present inventors have found out that, in order for tungsten oxide to have improved decomposition performance for an intermediate and improved gas adsorption power, it is effective that zirconium oxide higher in gas adsorption power than tungsten oxide is compounded to tungsten oxide.

The photocatalytic composite microparticles used in the aqueous dispersion of the embodiment contains the zirconium oxide whose mass ratio to the tungsten oxide is in the range of from 0.05 to 200%. The mass ratio of the zirconium oxide to the tungsten oxide is preferably in a range of from 0.1 to 150%, and more preferably in a range of from 10 to 100%. When the mass ratio of the zirconium oxide to the tungsten oxide is less than 0.05%, gas adsorption performance of the zirconium oxide cannot be fully exhibited, and hence it is not possible to improve photocatalytic performance of the tungsten oxide under an environment with a low gas concentration and the like. When the mass ratio of the zirconium oxide to the tungsten oxide is over 200%, the content of the tungsten oxide relatively reduces and accordingly performance (photocatalytic performance) itself as the visible-light responsive photocatalytic composite microparticles deteriorates.

Further, in the photocatalytic composite microparticles used in the embodiment, the ratio of the atomicity of the zirconium to the atomicity of the tungsten is preferably in the range of from 0.05 to 400%. The ratio of the atomicity of the zirconium to the atomicity of the tungsten is more preferably in a range of from 0.1 to 300%, and still more preferably in a range of from 10 to 200%. When the ratio of the atomicity of the zirconium is less than 0.05%, it is not possible to improve the photocatalytic performance of the tungsten oxide under the environment with a low gas concentration and the like since the gas adsorption performance of the zirconium oxide cannot be sufficiently exhibited. When the ratio of the atomicity of the zirconium is over 40%, the content of the tungsten oxide relatively reduces and accordingly the performance (photocatalytic performance) itself as the visible-light responsive photocatalytic composite microparticles deteriorates.

In the photocatalytic composite microparticles used in the embodiment, a compounding method of the tungsten oxide and the zirconium oxide is not particularly limited. As the composite microparticles of the tungsten oxide and the zirconium oxide, various kinds of composite microparticles are usable such as mixed microparticles of tungsten oxide microparticles and zirconium oxide microparticles (method of mixing powders), and composite microparticles in which the tungsten oxide carries the zirconium oxide or composite microparticles in which the zirconium oxide carries the tungsten oxide (carrying method). In using the carrying method as the compounding method of the tungsten oxide and the zirconium oxide, an immersion method using a metal solution, or the like may be employed.

When the zirconium oxide microparticles are used as a raw material of the photocatalytic composite microparticles, a shape of the zirconium oxide microparticles is not particularly limited, but primary particles of the zirconium oxide microparticles are preferably in a rod shape. Further, zirconium oxide sol having particles in which the rod-shaped primary particles are aggregated is more preferable. The zirconium oxide preferably has a monoclinic crystal structure. An existing form of the zirconium oxide in the photocatalytic composite microparticles is not particularly limited, and they can exist in various forms. The photocatalytic composite microparticles can contain an element substance of the zirconium oxide or the zirconium oxide forming a complex compound with the tungsten oxide. The zirconium oxide may form a complex compound with other metal element.

The photocatalytic composite microparticles contained in the aqueous dispersion of the embodiment has an average particles size in a range of not less than 20 nm nor more than 10 μm. Here, the average particle size of the microparticles (powder) in the specification of the present application refers to the D50 particle size in the particle size distribution. The aqueous dispersion of the embodiment is prepared by mixing the photocatalytic composite microparticles with the aqueous dispersion medium and subjecting the resultant to a dispersion process by an ultrasonic dispersion machine, a wet jet mill, a bead mill, or the like. In such an aqueous dispersion, the photocatalytic composite microparticles contain agglomerated particles in which the primary particles are aggregated. When the D50 particle size in a volume-based integrated diameter is in the range of not less than 20 nm nor more than 10 μm as a result of measuring the particle size distribution inclusive of the agglomerated particles by a wet laser diffraction particle size distribution analyzer, it is possible to obtain a good dispersion state and uniform and stable film formability of the photocatalytic composite microparticles. As a result, high photocatalytic performance can be exhibited.

In order to form a stable aqueous dispersion and obtain a uniform photocatalytic composite microparticle film by using this aqueous dispersion, the smaller the D50 particle size of the composite microparticles is the more preferable. When the D50 particle size of the composite microparticles is over 10 μm, it is not possible to obtain a sufficient property as the aqueous dispersion including the photocatalytic composite microparticles. On the other hand, when the D50 particle size of the composite microparticles is smaller than 20 nm, handleability of the raw material powder decreases because the particles are too small, leading to low practicality of the raw material powder and the aqueous dispersion prepared by using this. The D50 particle size of the photocatalytic composite microparticles is preferably in a range of not less than 50 nm nor more than 1 μm, and more preferably in a range of from 50 to 300 nm.

In the photocatalytic composite microparticles contained in the aqueous dispersion, a D90 particle size in the particle size distribution is preferably in a range of from 0.05 μm to 10 μm. When the D90 particle size of the composite microparticles is less than 0.05 μm, dispersibility deteriorates because of too small a particle size of the whole photocatalytic composite microparticles. This makes it difficult to obtain a uniform dispersion and a uniform coating material. When the D90 particle size of the composite microparticles is over 10 μm, film formability of the aqueous dispersion deteriorates, which makes it difficult to form a uniform and stable film. Accordingly, it may not be possible for the photocatalytic performance to be fully exhibited.

In order to form a uniform and smooth film and a high-strength film by the aqueous dispersion of the present invention, it is preferable to make the D90 particle size as small as possible by disintegrating the agglomerated particles. In order for the photocatalytic performance to be exhibited after the photocatalytic composite microparticles including the tungsten oxide according to the present invention is formed into a film, a condition is preferably set so that the dispersion process does not give an excessive strain to the microparticles. In order to form a uniform and stable film by using an aqueous dispersion and a coating material having good dispersibility, it is preferable to apply the aqueous dispersion or the coating material by a method such as spin coating, dipping, or spraying.

The performance of the photocatalytic microparticles is generally higher as a specific surface area is larger and the particle size is smaller. The tungsten oxide used in the photocatalytic composite microparticles is preferably tungsten oxide microparticles whose average primary particle size (D50 particle size) is in a range of from 1 to 400 nm. The BET specific surface area of the tungsten oxide microparticles is preferably in a range of from 4.1 to 820 m²/g. When the average primary particle size of the tungsten oxide microparticles is over 400 nm or when the BET specific surface area thereof is less than 4.1 m²/g, the photocatalytic performance of the tungsten oxide microparticles deteriorates and it becomes difficult to form a uniform and stable film. When the average primary particle size of the tungsten oxide microparticles is too small, dispersibility also deteriorates and it becomes difficult to prepare a uniform dispersion. The average primary particle size of the tungsten oxide microparticles is more preferably in a range of from 2.7 to 75 nm, and still more preferably in a range of from 5.5 to 51 nm. The BET specific surface area of the tungsten oxide microparticles is more preferably in a range of from 11 to 300 m²/g, and still more preferably in a range of from 16 to 150 m²/g.

Further, a crystal structure of the tungsten oxide microparticles is preferably stable. An unstable crystal structure is liable to deteriorate a dispersion state since, when the aqueous dispersion is stored for a long period, the crystal structure of the tungsten oxide microparticles changes and accordingly liquidity changes. Further, the tungsten oxide microparticles may contain a minute amount of a metal element and so on as impurities. The content of the metal element as an impurity element is preferably 2 mass % or less. The impurity metal elements include an element generally contained in a tungsten ore, a pollutant element which is mixed when a tungsten compound or the like used as the raw material is manufactured, and so on, and examples thereof are Fe, Mo, Mn, Cu, Ti, Al, Ca, Ni, Cr, Mg, and the like. This does not apply when these elements are used as constituent elements of the composite material.

When the tungsten oxide microparticles and the zirconium oxide microparticles are compounded, a ratio of an average primary particles size of the zirconium oxide microparticles ($D50_{ZrO2}$) to the average primary particle size of the tungsten oxide microparticles ($D50_{WO3}$) is preferably in a range of from 0.05 to 20. When the ratio of the average primary particle sizes ($D50_{ZrO2}/D50_{WO3}$) is smaller than 0.05 or larger than 20, primary particles of the tungsten oxide and the primary particles of the zirconium oxide extremely differ in size, which is likely to deteriorate uniform dispersibility of the composite microparticles in the aqueous dispersion medium. Accordingly, the effect of improving the photocatalytic performance of the tungsten oxide based on the gas adsorption power of the zirconium oxide decreases. As previously described, the zirconium oxide preferably has the rod-shaped primary particles. In this case, the average primary particles size of the zirconium oxide microparticles refers to an average major axis of the rod-shaped particles. The ratio of the average primary particle sizes ($D50_{ZrO2}/D50_{WO3}$) is more preferably in a range of from 0.1 to 5.

The aqueous dispersion of the embodiment has pH in the range of from 1 to 9. Since, when pH of the aqueous dispersion containing the visible-light responsive photocatalytic composite microparticles falls in the range of from 1 to 9, a zeta potential of the aqueous dispersion becomes minus, it is possible to realize an excellent dispersion state. According to such a dispersion and a coating material using the same, the thin and uniform coating of the base material or the like is possible. pH of the aqueous dispersion has a correlation with a concentration of the photocatalytic composite microparticles (particle concentration in the aqueous dispersion), and when pH changes, the dispersion state changes. When pH is in the range of from 1 to 9, a good dispersion state can be obtained.

When pH of the aqueous dispersion is less than 1, the zeta potential approaches zero, so that dispersibility of the photocatalytic composite microparticles deteriorates. When pH of the aqueous dispersion is more than 9, pH the aqueous dispersion approaches an alkali side too much, so that the tungsten oxide is easily dissolved. In order to adjust pH of the aqueous dispersion, an acid or alkali aqueous solution of hydrochloric acid, sulfuric acid, tetramethylammonium hydroxide (TMAH), ammonia, sodium hydroxide, or the like may be added.

pH of the aqueous dispersion is preferably in a range of from 2.5 to 7.5. By setting pH of the aqueous dispersion in the range of from 2.5 to 7.5, the photocatalytic performance (gas decomposition performance) can be more effectively exhibited. When a surface state of the particles is observed by FT-IR (Fourier transform infrared absorption spectroscopy) after an aqueous dispersion whose pH is in the range of from 2.5 to 7.5 is applied and dried, the absorption of a hydroxyl group is seen near 3700 cm$^{-1}$. By using such a film as a photocatalytic film, it is possible to obtain excellent decomposition performance for organic gas. When an aqueous dispersion whose pH is adjusted to 8 is applied and dried, the absorption of the hydroxyl group is reduced and gas decomposition performance also deteriorates. When pH of the aqueous dispersion is adjusted to 1.5, though the hydroxyl group exists, the zeta potential approaches 0, so that dispersibility slightly deteriorates and gas decomposition performance also slightly deteriorates.

Further, the aqueous dispersion preferably has a color whose a* is 10 or less, b* is −5 or more, and L* is 50 or more when the color of the aqueous dispersion is expressed by the L*a*b* color system. By applying a dispersion having such a color tone on a base material to form a film, it is possible to obtain good photocatalytic performance, and in addition, color of the base material is not impaired. Therefore, it is possible to obtain a coating material and a film.

The concentration of the photocatalytic composite microparticles (particle concentration) in the aqueous dispersion of the embodiment is preferably in a range of not less than 0.001 mass % nor more than 50 mass %. When the particle concentration is less than 0.001 mass %, the content of the photocatalytic composite microparticles becomes insufficient, and it may not be possible to obtain desired performance. When the particle concentration is over 50 mass %, the photocatalytic composite microparticles exist in close contact when they are formed into a film, and it is not possible to obtain a particle surface area large enough to make their performance exhibited. Not only sufficient performance cannot be exhibited but also cost of the dispersion and the film increases since a more than necessary amount of the photocatalytic composite microparticles are contained.

The concentration of the photocatalytic composite microparticles is more preferably in a range of from 0.01 to 20 mass %. According to the dispersion in which the concentration of the photocatalytic composite microparticles is 20 mass % or less, it is possible to easily realize a state in which the photocatalytic composite microparticles are uniformly dispersed. In a high-concentration dispersion containing the photocatalytic composite microparticles whose concentration is over 20 mass %, the dispersion state of the photocatalytic composite microparticles improves when the dispersion is diluted to prepare a coating material. Therefore, the use of the high-concentration dispersion containing 20 mass % photocatalytic composite microparticles or more has an advantage that the coating material in which the photocatalytic composite microparticles are uniformly dispersed can be efficiently prepared.

The photocatalytic composite microparticles contained in the aqueous dispersion may contain not only the tungsten oxide and the zirconium oxide but also a metal element (hereinafter referred to as an additive metal element) other than tungsten and zirconium. Examples of the metal element contained in the photocatalyst are a transition metal element except tungsten and zirconium, a zinc group element such as zinc, and an earth metal element such as aluminum. The transition metal elements are metals with atomic numbers 21 to 29, 39 to 47, 57 to 79, and 89 to 109, and among them, the metal elements except tungsten and zirconium can be contained in the photocatalytic composite microparticles. The zinc group elements are elements with atomic numbers 30, 48, 80, and the earth metal elements are elements with atomic numbers 13, 31, 49, 81. These metal elements may be contained in the photocatalytic composite microparticles. Adding these metal elements to the photocatalytic composite microparticles makes it possible to improve performance of the photocatalytic composite microparticles.

The content of the additive metal element in the photocatalytic composite microparticles is preferably in a range of from 0.001 to 50 mass % to the tungsten oxide. When the content of the additive metal element is over 50 mass % to the tungsten oxide, a property based on the tungsten oxide microparticles is liable to deteriorate. The content of the additive metal element is more preferably 10 mass % or less to the tungsten oxide. A lower limit value of the content of the additive metal element is not particularly limited, but in order to make the effect of adding the metal element more effectively exhibited, its content is preferably 0.001 mass % or more to the tungsten oxide. In order to prevent dispersibility deterioration of the aqueous dispersion, the content and a form of the additive metal element are preferably adjusted so as not to cause a great change in pH and the zeta potential. In consideration of such points, the content of the additive metal element is more preferably 2 mass % or less to the tungsten oxide.

The metal element (additive metal element) contained in the photocatalyst is preferably at least one selected from nickel (Ni), titanium (Ti), manganese (Mn), iron (Fe), palladium (Pd), platinum (Pt), ruthenium (Ru), copper (Cu), silver (Ag), aluminum (Al), and cerium (Ce). By making these metal elements contained in the photocatalyst in a range of from 0.005 to 10 mass %, it is possible to more effectively improve the photocatalytic performance of the photocatalyst of the embodiment. The content of the above metal element is more preferably in a range of from 0.005 to 2 mass % to the tungsten oxide.

In the photocatalytic composite microparticles of the embodiment, the metal element can exist in various forms. The photocatalytic composite microparticles can contain the metal element as an element substance of the metal element, a compound such as an oxide of the metal element, a complex compound with tungsten oxide or zirconium oxide, or the like. The metal element contained in the photocatalytic composite microparticles themselves may form a compound with another element. A typical form of the metal element in the photocatalytic composite microparticles is an oxide of the metal element. The metal element is mixed in the form of an element substance, a compound, a complex compound, or the like with, for example, the tungsten oxide powder or the zirconium oxide powder.

Further, a method of compounding the metal element in the photocatalytic composite microparticles is not particularly limited. As the compounding method of the metal element, a mixing method of mixing powders, an immersion method, a carrying method, or the like can be employed. Typical compounding methods are described below. An example of a method of compounding Ru is a method of adding a ruthenium chloride solution to the dispersion containing tungsten oxide and zirconium oxide. An example of a method of compounding Pt is a method of mixing a Pt powder to the dispersion containing tungsten oxide and zirconium oxide. An example of a method of compounding Cu is a method in which the tungsten oxide microparticles and the zirconium oxide microparticles are added and mixed in a water solution or an ethanol solution of copper nitrate or copper sulfate, followed by drying at a temperature of 70 to 80° C. and firing at a temperature of 500 to 550° C. (immersion method).

In the compounding method of the metal element, the immersion method is also applicable to an iron compounding method using an iron chloride solution, a silver compounding method using a silver chloride solution, a platinum compounding method using a chloroplatinic acid solution, a palladium compounding method using a palladium chloride solution, and the like. Further, tungsten oxide and zirconium oxide may be compounded with the metal element (oxide) by using oxide sol such as titanium oxide sol, aluminum sol, or the like.

In the aqueous dispersion of the embodiment, the aqueous dispersion medium is preferably water. However, as a dispersion medium other than water, alcohol may be contained in a range of less than 50 mass %. Methanol, ethanol, 1-propanol, 2-propanol, or the like is used as the alcohol. When the content of the alcohol is over 50 mass %, the aggregation is facilitated. The content of the alcohol is more preferably 20 mass % or less, and still more preferably 10 mass % or less. In the aqueous dispersion of the embodiment, the photocatalytic composite microparticles may be dispersed in the aqueous dispersion medium while being mixed with, carried by, or immersed in a material having adsorption performance such as activated carbon or zeolite.

The tungsten oxide microparticles (powder) used in the aqueous dispersion of the embodiment are preferably prepared by the following methods, but the method is not limited to these. The tungsten oxide microparticles are preferably prepared by employing a sublimation process. Combining a heat treatment process with the sublimation process is also effective. According to tungsten trioxide microparticles prepared by such a method, it is possible to stably realize the aforesaid average primary particle size, BET specific surface area, and crystal structure. Further, the average primary particle size approximates a value converted from the BET specific surface area, and it is possible to stably obtain microparticles (fine powder) having a small variation in particle size.

First, the sublimation process will be described. The sublimation process is a process of obtaining the tungsten trioxide microparticles by sublimating a metal tungsten powder, a tungsten compound powder, or a tungsten compound solution in an oxygen atmosphere. The sublimation is a phenomenon that a state change from a solid phase to a vapor phase or from a vapor phase to a solid phase occurs without going through a liquid phase. By oxidizing the metal tungsten powder, the tungsten compound powder, or the tungsten compound solution as the raw material while sublimating it, it is possible to obtain a tungsten oxide powder in a microparticle state.

As the raw material (tungsten raw material) of the sublimation process, any of the metal tungsten powder, the tungsten compound powder, and the tungsten compound solution may be used. Examples of the tungsten compound used as the raw material are tungsten oxide such as tungsten trioxide ($WO_3$), tungsten dioxide ($WO_2$), and a low-grade oxide, tungsten carbide, ammonium tungstate, calcium tungstate, tungstic acid, and the like.

When the sublimation process of the tungsten raw material as described above is performed in the oxygen atmosphere, the metal tungsten powder or the tungsten compound powder instantaneously changes from the solid phase to the vapor phase, and when metal tungsten vapor in the vapor phase is further oxidized, the tungsten oxide microparticles are obtained. When a solution is used as well, the tungsten raw material changes to the vapor phase through a tungsten oxide or compound. By thus using an oxidative reaction in the vapor phase, it is possible to obtain the tungsten oxide microparticles. Further, it is possible to control the crystal structure of the tungsten oxide microparticles.

As the raw material of the sublimation process, at least one kind selected from a metal tungsten powder, a tungsten oxide power, a tungsten carbide powder, and an ammonium tungstate powder is preferably used because impurities are not easily contained in the tungsten oxide microparticles obtained after the sublimation in the oxygen atmosphere. Not containing a harmful substance as a by-product (substance other than tungsten oxide) formed by the sublimation process, the metal tungsten powder and the tungsten oxide powder are especially preferable as the raw material of the sublimation process.

As the tungsten compound used as the raw material, a compound containing tungsten (W) and oxygen (O) as its constituent elements is preferable. When W and O are contained as the constituent components, the raw material is easily sublimated instantaneously when later-described inductively coupled plasma processing or the like is employed in the sublimation process. Examples of such a tungsten compound are $WO_3$, $W_{20}O_{58}$, $W_{18}O_{49}$, $WO_2$, and the like. Further, a solution, a salt, or the like of tungstic acid, ammonium paratungstate, or ammonium metatungstate is also effective.

When the tungsten oxide composite microparticles are prepared, a transition metal element and other element may be mixed in a form of metal, a compound containing an oxide, a complex compound, or the like in addition to the tungsten raw material. By processing the tungsten oxide simultaneously with the other element, it is possible to obtain complex compound microparticles such as a composite oxide of the tungsten oxide and the other element. It is also possible to obtain the tungsten oxide composite microparticles by mixing or carrying the tungsten oxide microparticles with/by element particles or compound particles of the other element. A compounding method of the tungsten oxide and the other metal element is not particularly limited, and various well-known methods can be employed.

The metal tungsten powder or the tungsten compound powder as the tungsten raw material preferably has an average particle size in a range of from 0.1 to 100 μm. The average particle size of the tungsten raw material is more preferably in a range of from 0.3 μm to 10 μm, and more preferably in a range of from 0.3 μm to 3 μm. The use of the metal tungsten powder or the tungsten compound powder having the average particle size within the aforesaid range easily causes the sublimation. When the average particle size of the tungsten raw material is less than 0.1 μm, advance adjustment of the raw material powder is necessary or handleability decreases because the raw material powder is too fine. When the average particle size of the tungsten raw material is over 100 μm, a uniform sublimation reaction is difficult to occur. Even when the average particle size is large, a uniform sublimation reaction can be caused by the processing with a large energy amount, but this is not industrially preferable.

As a method to sublimate the tungsten raw material in the oxygen atmosphere in the sublimation process, usable is at least one kind of processing selected from inductively coupled plasma processing, arc discharge processing, laser processing, electron beam processing, and gas burner processing. Among them, the laser processing and the electron beam processing perform the sublimation process by laser or electron beam irradiation. The laser and the electron beam has a small irradiation spot diameter, and therefore has a merit that the particle size of the raw material powder and stability of its supply amount need not be strictly controlled though taking a long time to process a large amount of the raw material at a time.

The inductively coupled plasma processing and the arc discharge processing can cause the oxidative reaction of a large amount of the raw material powder in the oxygen atmosphere at a time though requiring adjustment of a generation region of plasma and arc discharge. Further, it is possible to control an amount of the raw material that can be processed at a time. The gas burner processing has a difficulty in processing a large amount of the raw material powder and the raw material solution though requiring a relatively low power expense. Therefore, the gas burner processing is inferior in productivity. Incidentally, the gas burner processing may be any provided that it has energy large enough to cause the sublimation, and is not particularly limited. A propane gas burner, an acetylene gas burner, and the like are used.

When the inductively coupled plasma processing is employed for the sublimation process, generally used is a method in which argon gas and oxygen gas are used to generate plasma and the metal tungsten powder or the tungsten compound powder is supplied into the plasma. Examples of a method of supplying the tungsten raw material into the plasma are a method of blowing the metal tungsten powder or the tungsten compound powder together with carrier gas, a method of blowing a dispersion in which the metal tungsten powder or the tungsten compound powder is dispersed in a predetermined liquid dispersion medium, and so on.

Examples of the carrier gas used when the metal tungsten powder or the tungsten compound powder is blown into the plasma are air, oxygen, inert gas containing oxygen, and so on. Among them, the air is preferably used because of its low cost. Inert gas such as argon and helium may be used as the carrier gas when a reaction field contains sufficient oxygen such as when reaction gas containing oxygen besides the carrier gas is supplied or when the tungsten compound powder is tungsten trioxide. Oxygen, inert gas containing oxygen, or the like is preferably used as the reaction gas. When the inert gas containing oxygen is used, it is preferable that an amount of oxygen is set so as to enable the supply of a sufficient amount of oxygen necessary for the oxidative reaction.

By employing the method of blowing the metal tungsten powder or the tungsten compound powder together with the carrier gas and by adjusting a gas flow rate, a pressure of a reaction vessel, and so on, it becomes easy to control the crystal structure of the tungsten trioxide microparticles. Concretely, it is easy to obtain at least one kind selected from a monoclinic crystal and a triclinic crystal (monoclinic crystal, triclinic crystal, or mixed crystal of monoclinic crystal and triclinic crystal) or to obtain the tungsten trioxide microparticles having the crystal structure in which a rhombic crystal is mixed in the above. The crystal structure of the tungsten trioxide microparticles is more preferably a mixed crystal of a monoclinic crystal and a triclinic crystal or a mixed crystal of a monoclinic crystal, a triclinic crystal, and a rhombic crystal.

An example of the dispersion medium used for preparing the dispersion of the metal tungsten powder or the tungsten compound powder is a liquid dispersion medium having oxygen atoms in its molecules. The use of the dispersion facilitates handling the raw material powder. As the liquid dispersion medium having the oxygen atoms in its molecules, one containing 20 vol % or more of at least one kind selected from water and alcohol is used, for instance. As the alcohol used as the liquid dispersion medium, at least one kind selected from methanol, ethanol, 1-propanol, and 2-propanol is preferable, for instance. Water and alcohol are easily volatilized by heat of the plasma and thus do not obstruct the sublimation reaction and the oxidative reaction of the raw material powder, and they contain oxygen in their molecules and thus easily promote the oxidative reaction.

When the dispersion is prepared by dispersing the metal tungsten powder or the tungsten compound powder in the dispersion medium, the content of the metal tungsten powder or the tungsten compound powder in the dispersion is preferably in a range of from 10 to 95 mass %, and more preferably in a range of from 40 to 80 mass %. By dispersing the metal tungsten powder or the tungsten compound powder with such a content range in the dispersion, it is possible to uniformly disperse the metal tungsten power or the tungsten compound powder in the dispersion. The uniformly dispersed state facilitates the uniform sublimation reaction of the raw material powder. When the content in the dispersion is less than 10 mass %, efficient manufacture is not enabled due to too small an amount of the raw material powder. When the content is over 95 mass %, an amount of the dispersion is small and hence the viscosity of the raw material powder increases, so that the raw material powder is likely to stick to the vessel, which decreases handleability.

By employing the method of blowing the metal tungsten powder or the tungsten compound powder as the dispersion into the plasma, it becomes easy to control the crystal structure of the tungsten trioxide microparticles. Concretely, it is easy to obtain the tungsten trioxide microparticles having the crystal structure in which at least one kind selected from the monoclinic crystal and the triclinic crystal is mixed or the rhombic crystal is mixed with this. Further, the use of a tungsten compound solution as the raw material also enables a uniform sublimation reaction and in addition improves controllability of the crystal structure of the tungsten trioxide microparticles. The aforesaid method using the dispersion is also applicable to the arc discharge processing.

When the sublimation process is carried out by the irradiation of the laser or the electron beam, a pelletized metal tungsten or tungsten compound is preferably used as the raw material. Since the laser or the electron beam has a small irradiation spot diameter, the supply becomes difficult when the metal tungsten powder or the tungsten compound powder is used, but the use of the pelletized metal tungsten or tungsten compound enables efficient sublimation. The laser may be any, provided that it has energy large enough to sublimate the metal tungsten or the tungsten compound, and is not particularly limited, but $CO_2$ laser is preferable because of its high energy.

Moving at least one of an irradiation source of the laser light or the electron beam and the pellet when the pellet is irradiated with the laser or the electron beam makes it possible to effectively sublimate the whole surface of the pellet having a certain size. Consequently, it is possible to easily obtain the tungsten trioxide powder having the crystal structure in which at least one kind selected from the monoclinic crystal and the triclinic crystal is mixed with the rhombic crystal. The aforesaid pellet is also applicable to the inductively coupled plasma processing and the arc discharge processing.

The tungsten oxide microparticles used in the aqueous dispersion of this embodiment can be obtained only by the sublimation process described above, but it is also effective to apply a heat-treat process to the tungsten oxide microparticles prepared by the sublimation process. The heat treatment process is to heat-treat the tungsten trioxide microparticles obtained in the sublimation process at a predetermined temperature for a predetermined time in an oxygen atmosphere. Even when the tungsten trioxide microparticles cannot be sufficiently formed under the control condition and so on of the sublimation process, the heat treatment can make a ratio of the tungsten trioxide microparticles in the tungsten oxide microparticles 99% or more, practically 100%. Further, the heat treatment process can adjust the crystal structure of the tungsten trioxide microparticles to a predetermined structure.

An example of the oxygen atmosphere used in the heat treatment process is air and oxygen-containing gas. The oxygen-containing gas means inert gas containing oxygen. The heat treatment temperature is preferably in a range of from 200 to 1000° C., and more preferably 400 to 700° C. The heat treatment time is preferably ten minutes to five hours, and more preferably thirty minutes to two hours. By setting the temperature and the time of the heat treatment process to the aforesaid ranges, it is easy to form tungsten trioxide from tungsten oxide other than tungsten trioxide. Further, in order to obtain a powder having a small number of defects and good crystallinity, it is preferable to slowly increase and decrease the temperature at the time of the heat treatment. Rapid heating and cooling at the time of the heat treatment cause deterioration of crystallinity.

When the heat treatment temperature is lower than 200° C., it may not be possible to sufficiently obtain an oxidizing effect for turning the powder which does not change into tungsten trioxide in the sublimation process into tungsten trioxide. When the heat treatment temperature is higher than 1000° C., the tungsten oxide microparticles rapidly grow and accordingly a specific surface area of the obtained tungsten oxide microparticles is likely to decrease. Further, the heat treatment process at and for the aforesaid temperature and time makes it possible to adjust the crystal structure and crystallinity of the tungsten trioxide microparticles.

The aqueous dispersion of this embodiment is usable as a film forming material as it is. The aqueous dispersion may be mixed with a binder component or the like to fabricate a coating material, and the coating material may be used as the film forming material. The coating material contains not only the aqueous dispersion but also at least one kind of a binder component selected from an inorganic binder and an organic binder. The content of the binder component is preferably in a range of from 5 to 95 mass %. When the content of the binder component is over 95 mass %, it may not be possible to obtain desired photocatalytic performance. When the content of the binder component is less than 5 mass %, sufficient bonding strength cannot be obtained and a film property is liable to deteriorate. Applying such a coating material makes it possible to adjust strength, hardness, adhesion to the base material, and so on of the film to desired states.

As the inorganic binder, used are, for example, alkyl silicate, silicon halide, a product obtained through decomposition of a hydrolytic silicon compound such as a partial hydrolysate of any of these, an organopolysiloxane compound and its polycondensate, silica, colloidal silica, water glass, a silicon compound, phosphate such as zinc phosphate, metal oxide such as zinc oxide and zirconium oxide, biphosphate, cement, gypsum, lime, enameling frit, and so on. As the organic binder, used are, for example, fluorine-based resin, silicone resin, acrylic resin, epoxy resin, polyether resin, melamine resin, urethane resin, alkyd resin, and so on.

Applying the aforesaid aqueous dispersion or coating material on the base material makes it possible to stably and uniformly form a film containing the visible-light responsive photocatalytic composite microparticles. As the base material forming such a photocatalytic film, used are glass, ceramics, plastic, resin such as acryl, paper, fiber metal, wood, and so on. A film thickness is preferably in a range of from 2 to 1000 nm. When the film thickness is less than 2 nm, it may not be possible to obtain a state where the tungsten oxide microparticles and the zirconium oxide microparticles uniformly exist. When the film thickness is over 1000 nm, adhesion to the base material lowers. The film thickness is more preferably in a range of from 2 to 400 nm.

The photocatalytic film of this embodiment exhibits photocatalytic performance under visible light irradiation. Generally, the visible light is light whose wavelength is in a 380 to 830 nm range, and is light radiated by using, as a light source, an ordinary lighting such as a white fluorescent light, sunlight, white LED, an electric bulb, a halogen lamp, and a xenon lamp, and a blue light-emitting diode, a blue laser, and the like. The photocatalytic film of this embodiment exhibits photocatalytic performance under an ordinary indoor environment. The photocatalytic performance is an action in which an electron-hole pair is excited per photon as a result of light absorption, the excited electron and hole activate a hydroxyl group and acid present on a surface by redox, and organic gas or the like is oxidatively decomposed by activated oxygen species generated by the activation, and is an action for exhibiting a hydrophilic property, antibacterial/disinfection performance, and the like.

The product of this embodiment includes the photocatalytic film formed by using the aforesaid aqueous dispersion or coating material. Concretely, it is a product in which the photocatalytic film is formed by applying the aqueous dispersion or the coating material on the surface of the base material forming the product. The film formed on the surface of the base material may contain zeolite, activated carbon, porous ceramics, and like. The aforesaid photocatalytic film and the product including the same have characteristics of being excellent in decomposition performance for organic gas such as acetaldehyde and formaldehyde under visible light irradiation, and exhibiting high activity especially even under low illuminance. The film of this embodiment exhibits a hydrophilic property in contact angle measurement of water. Further, in evaluation of antibacterial performance for *staphylococcus aureus* and colon *bacillus* under visible light irradiation, the film exhibits a high antibacterial action.

Concrete examples of the product including the photocatalytic film of the embodiment are an air-conditioner, an air cleaner, an electric fan, a refrigerator, a microwave oven, a dish washer/drier, a rice cooker, a pot, a pan lid, an IH heater, a washing machine, a cleaner, a lighting fixture (lamp, fixture body, shade, and the like), sanitary goods, a toilet stool, a washstand, a mirror, a bathroom (wall, ceiling, floor, and the like), building materials (indoor wall, ceiling material, floor, outer wall, and the like), interior products (curtain, carpet, table, chair, sofa, shelf, bed, bedding, and the like), glass, a sash, a handrail, a door, a knob, clothes, filters used in home electric appliances, stationery, kitchen utensils, members used in an indoor space of an automobile, and so on. Being provided with the photocatalytic film of the embodiment, the product can be given visible-light responsive photocatalytic performance.

When a fiber is used as the base material, examples of a fiber material are synthetic fibers such as polyester, nylon, and acrylic, regenerated fibers such as rayon, natural fibers such as cotton, wool, and silk, and a combined filament yarn, union cloth, and a blend of these, and so on. The fiber material may be in a loose form. The fiber may take any form such as woven fabric, knitted fabric, nonwoven fabric, and the like, and may be those having ordinary dyeing and printing. When the aqueous dispersion is used for the fiber material, a method of co-using the photocatalytic composite microparticles with a resin binder and fixing the resultant to the fiber material is convenient.

As the resin binder, water-soluble, water-dispersible, or solvent-soluble resin can be used. Concretely, melamine resin, epoxy resin, urethane resin, acrylic resin, fluorine resin, or the like is used, but these are not restrictive. When the aqueous dispersion is used and the photocatalytic composite microparticles are fixed to the fiber material, for example, the aqueous dispersion is mixed with the water-dispersible or water-soluble resin binder to prepare a resin liquid, and the fiber material is immersed in the resin liquid and thereafter is squeezed by a mangle roll to be dried. By thickening the resin liquid, it is possible to coat one surface of the fiber material with the resin liquid by a well-known apparatus such as a knife coater. It is also possible to make the visible-light responsive photocatalytic composite microparticles adhere on one surface or both surfaces of the fiber material by using a gravure roll.

When the aqueous dispersion is used and the photocatalytic composite microparticles are made to adhere on the fiber surface, if an adhesion amount is too small, it is not possible to sufficiently exhibit photocatalytic performance such as gas decomposition performance and antibacterial performance of tungsten oxide has. When the adhesion amount is too large, though the performance that tungsten oxide has is exhibited, feeling as the fiber material sometimes deteriorates. An appropriate adhesion amount is preferably selected according to the material or an intended use. Clothes and interior products using the fiber on whose surface the photocatalytic composite microparticles contained in the aqueous dispersion adhere exhibit excellent odor eliminating effect and antibacterial effect under visible light irradiation in an indoor environment.

Next, examples and evaluation results thereof will be described. In the following examples, the inductively coupled plasma processing is employed in the sublimation process, but the present invention is not limited to this.

EXAMPLE 1

First, a tungsten trioxide powder having a 0.5 μm average particle size was prepared as a raw material powder. This raw material powder was sprayed together with carrier gas (Ar) to RF plasma, and further as reaction gas, argon was supplied at a 40 L/min flow rate and oxygen was supplied at a 40 L/mn flow rate. In this manner, through the sublimation process to cause the raw material powder to undergo an oxidative reaction while sublimating the raw material powder, a tungsten oxide powder was prepared. The tungsten oxide powder was heat-treated in the atmosphere under a condition of 900° C.×1.5 h. The tungsten oxide powder was dispersed in water so that its concentration became 10 mass %. In this manner, a first dispersion containing tungsten oxide microparticles was prepared.

An average primary particle size (D50 particle size) and a BET specific surface area of the obtained tungsten oxide powder were measured. The average primary particle size was measured by image analysis of a TEM photograph. In the TEM observation, a transmission electron microscope H-7100FA (trade name, manufactured by Hitachi Ltd.) was used, an enlarged photograph was subjected to the image analysis, 50 pieces of the particles or more were extracted, a volume-based integrated diameter was found, and the D50 particle size was calculated. For the measurement of the BET specific surface area, a specific surface area analyzer Macsorb 1201 (trade name, manufactured by Mountech Co., Ltd.) was used. A pre-process was carried out in nitrogen under a condition of 200°×twenty minutes. The average primary particle size (D50 particle size) was 25 nm and the BET specific surface area was 35 m$^2$/g.

Next, a zirconium oxide powder having rod-shaped primary particles was prepared. A D50 particle size (average major axis of the primary particles) in particle size distribution of the zirconium oxide powder is 20 nm. A ratio of the average major axis of the primary particles (average primary particle size) of the zirconium oxide powder to the average primary particle size of the tungsten oxide powder is 0.8. The zirconium oxide powder was dispersed in water so that its concentration became 20 mass %, whereby a second dispersion was prepared.

The first dispersion and the second dispersion were mixed so that a mass ratio of zirconium oxide to tungsten oxide became 100%. A ratio of the atomicity of the zirconium to the atomicity of the tungsten is 188%. The pH of a mixed dispersion of the first dispersion and the second dispersion was adjusted so as to fall in a range of from 5.5 to 6.5 by using water, sulfuric acid, and TMAH. For the dispersion process, a bead mill was used. In this manner, the intended aqueous dispersion was prepared. In the aqueous dispersion, the particle concentration (concentration of a mixture of the tungsten oxide microparticles and the zirconium oxide microparticles) was 12 mass % and the pH value was 5.

EXAMPLE 2

By using a tungsten oxide powder prepared by the same method as that of the example 1, a first dispersion was prepared in the same manner as that of the example 1. When an average primary particle size (D50 particle size) of the tungsten oxide powder was measured in the same manner as that of the example 1, the average primary particle size was 25 nm. After the tungsten oxide powder was dispersed in water so that its concentration became 10 mass %, a ruthenium chloride solution was mixed so that a ratio of ruthenium to the tungsten oxide became 0.02 mass %. pH of this mixed liquid was adjusted to 6 while ammonia was dropped to this mixed liquid.

Next, a zirconium oxide powder having rod-shaped primary particles was prepared. A D50 particle size (average major axis of the primary particles) in particle size distribution of the zirconium oxide powder is 20 nm. A ratio of the average major axis of the primary particles (average primary particle size) of the zirconium oxide powder to the average primary particle size of the tungsten oxide powder is 0.8. The zirconium oxide powder was dispersed in water so that its concentration became 20 mass %, whereby a second dispersion was prepared.

The second dispersion containing the zirconium oxide microparticles was dropped to the first dispersion containing the tungsten oxide microparticles and ruthenium chloride, and pH was adjusted so as to fall in a range of from 5.5 to 6.5. In an aqueous dispersion, the mass ratio of zirconium oxide to tungsten oxide is 50%, and the ratio of the atomicity of the zirconium to the atomicity of the tungsten is 94%. In this manner, the intended aqueous dispersion was prepared. In the aqueous dispersion, the particle concentration was 12 mass % and the pH value was 6.

EXAMPLE 3

By using a tungsten oxide powder prepared by the same method as that of the example 1, a first dispersion was prepared in the same manner as that of the example 1. When an average primary particle size (D50 particle size) of the tungsten oxide powder was measured in the same manner as that of the example 1, the average primary particle size was 25 nm. After the tungsten oxide powder was dispersed in water so that its concentration became 10 mass %, Pt particles were mixed so that a ratio of platinum to tungsten oxide became 2 mass %.

Next, a zirconium oxide powder having rod-shaped primary particles was prepared. A D50 particle size (average major axis of the primary particles) in particle size distribution of the zirconium oxide powder is 20 nm. A ratio of the average major axis of the primary particles (average primary particle size) of the zirconium oxide powder to the average primary particle size of the tungsten oxide powder is 0.8. The zirconium oxide powder was dispersed in water so that its concentration became 20 mass %, whereby a second dispersion was prepared.

The first dispersion containing the tungsten oxide microparticles and the Pt microparticles and the second dispersion containing the zirconium oxide microparticles were mixed so that a mass ratio of zirconium oxide to tungsten oxide became 10%. A ratio of the atomicity of the zirconium to the atomicity of the tungsten is 18.8%. The pH of a mixed dispersion of the first dispersion and the second dispersion was adjusted so as to fall in a range of from 5.5 to 6.5 by using water, sulfuric acid, and TMAH. For the dispersion process, a bead mill was used. In this manner, the intended aqueous dispersion was prepared. In the aqueous dispersion, the particle concentration was 12 mass % and the pH value was 7.

COMPARATIVE EXAMPLE 1

As an aqueous dispersion of a comparative example 1, an aqueous dispersion in which only the tungsten oxide powder was dispersed in the example 1 was prepared.

By using the aqueous dispersions of the above-described examples 1 to 3 and comparative example 1, photocatalytic films were formed on glass surfaces. Photocatalytic performance of the photocatalytic films under visible light irradiation was evaluated. The photocatalytic performance was evaluated by measuring a decomposition rate of acetaldehyde gas. Concretely, the gas decomposition rate was measured under the following conditions by using a flow-type apparatus similar to that used for nitrogen oxide removal performance (decomposition ability) evaluation of JIS-R-1701-1 (2004).

A decomposition test of the acetaldehyde gas was conducted as follows. An initial concentration of acetaldehyde is 10 ppm, a gas flow rate is 140 mL/min, and a sample amount is 0.2 g. For the adjustment of samples, they are applied on 5×10 cm glass plates to be dried. A pre-process is twelve-hour irradiation with black light. As a light source, a white fluorescent light (FL20SS•W/8 manufactured by Toshiba Lighting & Technology Corporation) is used, and wavelengths less than 380 nm is cut by using an ultraviolet cut filter (CLAREX N-169 manufactured by Nitto Jushi Kogyo Co., Ltd.). Illuminance is adjusted to 250lx. First, without light irradiation, the end and stabilization of gas adsorption are waited for. After the stabilization, the light irradiation is started. The light irradiation is performed under such a condition, and a gas concentration is measured fifteen minutes later to find the gas decomposition rate. However, when the gas concentration does not become stable even after fifteen minutes pass, the concentration measurement is continued until it is stabilized.

Figure 1:
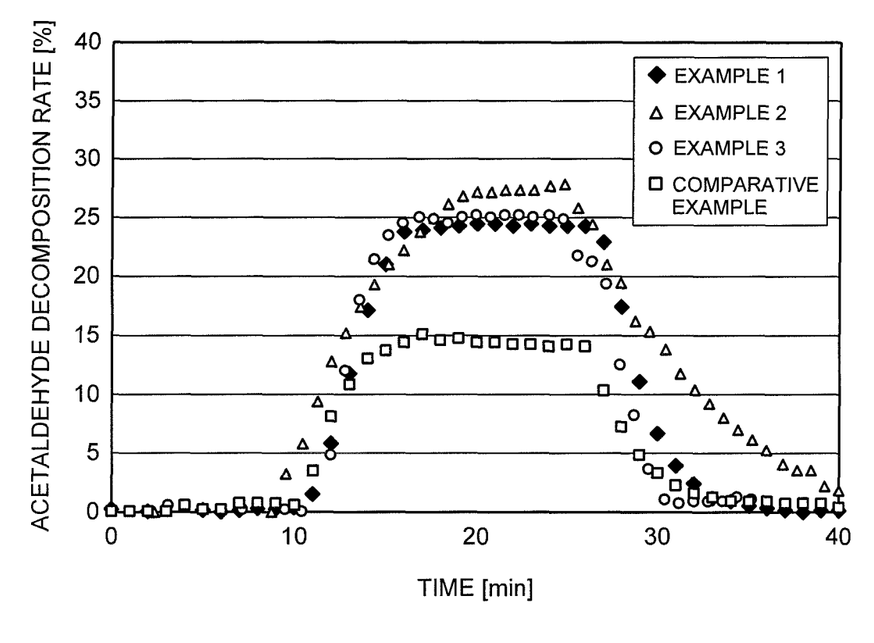
FIG. 1 is a chart illustrating changes of a gas decomposition rate of photocatalytic films formed by using aqueous dispersions of examples and a comparative example.

The gas decomposition rate (%) is defined as a value calculated based on [expression: $(A-B)/A \times 100$] from a gas concentration A and a gas concentration B, where A is a gas concentration before the light irradiation and B is a gas concentration when fifteen minutes or more pass from the light irradiation and the gas concentration is stabilized. As a gas analysis device, a multi-gas monitor 1412 manufactured by INOVA was used. The measurement results are presented in Table 3. Further, changes of the gas decomposition rate with the elapsed time of the light irradiation are presented in FIG. 1. Incidentally, properties of raw material powders used to prepare the aqueous dispersions are presented in Table 1, and properties of the aqueous dispersions are presented in Table 2.

TABLE 1

| | Raw material powder | | |
|---|---|---|---|
| | $WO_3$ powder D50 particle size [nm] | $ZrO_2$ powder D50 particle size [nm] | Particle size ratio ($ZrO_2/WO_3$) |
| Example 1 | 25 | 20 | 0.8 |
| Example 2 | 25 | 20 | 0.8 |
| Example 3 | 25 | 20 | 0.8 |
| Comparative Example 1 | 25 | — | — |

TABLE 2

| | Aqueous dispersion | | | | Additive | | |
|---|---|---|---|---|---|---|---|
| | $ZrO_2/WO_3$ mass ratio [%] | Zr/W atomicity ratio | particle concentration [mass %] | pH | additive element | addition form | addition ratio* [mass %] |
| Example 1 | 100 | 188 | 12 | 5 | — | — | — |
| Example 2 | 50 | 94 | 12 | 6 | Ru | $RuCl_3$ | 0.02 |
| Example 3 | 10 | 18.8 | 12 | 7 | Pt | Pt particles | 2 |
| Comparative Example 1 | — | — | 10 | 6 | — | — | — |

*mass ratio of additive element to $WO_3$

TABLE 3

| | Gas decomposition rate [%] |
|---|---|
| Example 1 | 24.3 |
| Example 2 | 27.8 |
| Example 3 | 24.7 |
| Comparative Example 1 | 14.1 |

It was confirmed that photocatalytic films formed by using the aqueous dispersions of the examples 1 to 3 were high in decomposition speed of acetaldehyde and high in gas decomposition rate. This is because zirconium oxide adsorbs the gas, so that photocatalytic performance of tungsten oxide was fully exhibited even under an environment with a low gas concentration. Further, it is seen that photocatalytic performance is further improved since decomposition performance of an intermediate generated at the time of the decomposition of the gas also improves.

Further, the aqueous dispersions of the examples 1 to 3 and the comparative example 1 were each mixed in an acrylic resin-based resin liquid, and a plain weave fabric made of polyester with a 150 g/m² areal weight was immersed in this mixed liquid (coating material), whereby polyester fibers on which the photocatalytic composite microparticles adhered were fabricated. 5×10 cm samples were cut out from the respective fibers, and their photocatalytic performance under visible light irradiation was evaluated by the same method as the previously described method. As a result, it was confirmed that the polyester fibers on which the photocatalytic composite microparticles of the examples 1 to 3 adhered were higher in the decomposition rate of the acetaldehyde gas than the fiber immersed in the coating material using the aqueous dispersion prepared in the comparative example 1. Further, when ten samples fabricated in the same manner were prepared and their variation in performance was evaluated, it was confirmed that, since the dispersions of the examples 1 to 3 had excellent dispersibility, an adhesion amount of their photocatalytic composite microparticles to the fibers was stable. Further, it was confirmed that the polyester fibers kept uniform feeling.

According to the photocatalytic films using the aqueous dispersions of the examples, it is possible to stably exhibit decomposition performance of organic gas such as acetaldehyde gas under visible light irradiation. Therefore, they are suitably used for members used in indoor space of an automobile, building materials used in factories, shops, schools, public facilities, hospitals, welfare facilities, accommodation facilities, houses, and so on, interior materials, household electric appliances, and so on. Further, the gas decomposition speed of the photocatalytic films do not decrease even when the gas concentration decreases, and high gas decomposition performance is maintained. Therefore, it is possible to obtain high odor eliminating and deodorizing effects. Such a photocatalytic film and a product using the same can have various applications by utilizing the properties that the photocatalytic composite microparticles have.

Several embodiments of the present invention are described, but it should be noted that these embodiments are only exemplary presentations and are not intended to limit the scope of the invention. These novel embodiments can be implemented in other various forms, and various omissions, substitutions, and changes can be made therein without departing from the spirit of the invention. These embodiments and their modifications are included in the scope and spirit of the invention and are also included in the scope of the inventions described in the claims and their equivalencies.

The invention claimed is:

1. A method for manufacturing a photocatalytic film, comprising:
    preparing an aqueous dispersion including a visible-light responsive photocatalytic composite microparticles containing tungsten oxide microparticles and zirconium oxide microparticles, and an aqueous dispersion medium in which the photocatalytic composite microparticles are dispersed; and
    applying the aqueous dispersion on a base material to form a photocatalytic film having a film thickness in a range of 2 to 1000 nm,
    wherein the photocatalytic composite microparticles are dispersed in the aqueous dispersion medium in a range of 0.001 to 50 mass %;
    wherein a D50 particle size in a particle size distribution of the photocatalytic composite microparticles is in a range of 20 nm to 10 μm;
    wherein the zirconium oxide microparticles have rod-shaped primary particles, and a ratio of an average major axis of the rod-shaped primary particles to an average primary particle size of the tungsten oxide microparticles is in a range of 0.05 to 20; and
    wherein a pH of the aqueous dispersion is in a range of 1 to 9.

2. The method according to claim 1,
    wherein the photocatalytic composite microparticles contain at least one metal element selected from the group consisting of nickel, titanium, manganese, iron, palladium, platinum, ruthenium, copper, silver, aluminum, and cerium; and
    wherein the photocatalytic composite microparticles contain the zirconium oxide microparticles in a range of 10 to 200 mass % with respect to the tungsten oxide microparticles, the metal element in a range of 0.005 to 2 mass % with respect to the tungsten oxide microparticles, and the balance being the tungsten oxide microparticles.

3. The method according to claim 1,
    wherein the D50 particle size of the photocatalytic composite microparticles is in a range of 50 nm to 1 μm; and
    wherein the pH of the aqueous dispersion is in a range of 5 to 7.5.

4. The method according to claim 1,
    wherein a D90 particle size in a particle size distribution of the photocatalytic composite microparticles is in a range of 0.05 to 10 μm.

5. The method according to claim 1,
    wherein the aqueous dispersion contains at least one selected from the group consisting of activated carbon, zeolite, and porous ceramics.

6. The method according to claim 1,
    wherein the base material is made of glass, ceramics, resin, metal, paper, fiber, or wood.

7. The method according to claim 1,
    wherein the photocatalytic film is formed on a surface of a building material, an interior material, a home electric appliance, or a filter used in a home electric appliance.

8. A method for manufacturing a photocatalytic film, comprising:
    preparing a coating material comprising: an aqueous dispersion including a visible-light responsive photocatalytic composite microparticles containing tungsten oxide microparticles and zirconium oxide microparticles, and an aqueous dispersion medium in which the photocatalytic composite microparticles are dispersed; and a binder component comprising at least one selected from the group consisting of an inorganic binder and an organic binder; and
    applying the coating material on a base material to form a photocatalytic film having a film thickness in a range of 2 to 1000 nm,
    wherein the photocatalytic composite microparticles are dispersed in the aqueous dispersion medium in a range of 0.001 to 50 mass %;
    wherein a D50 particle size in a particle size distribution of the photocatalytic composite microparticles is in a range of 20 nm to 10 μm;
    wherein the zirconium oxide microparticles have rod-shaped primary particles, and a ratio of an average major axis of the rod-shaped primary particles to an average primary particle size of the tungsten oxide microparticles is in a range of 0.05 to 20; and
    wherein a pH of the aqueous dispersion is in a range of 1 to 9.

9. The method according to claim 8,
    wherein the photocatalytic composite microparticles contain at least one metal element selected from the group consisting of nickel, titanium, manganese, iron, palladium, platinum, ruthenium, copper, silver, aluminum, and cerium; and
    wherein the photocatalytic composite microparticles contain the zirconium oxide microparticles in a range of 10 to 200 mass % with respect to the tungsten oxide microparticles, the metal element in a range of 0.005 to 2 mass % with respect to the tungsten oxide microparticles, and the balance being the tungsten oxide microparticles.

10. The method according to claim 8,
    wherein the D50 particle size of the photocatalytic composite microparticles is in a range of 50 nm to 1 μm; and
    wherein the pH of the aqueous dispersion is in a range of 5 to 7.5.

11. The method according to claim 8,
    wherein a D90 particle size in a particle size distribution of the photocatalytic composite microparticles is in a range of 0.05 to 10 μm.

12. The method according to claim 8,
    wherein the coating material contains at least one selected from the group consisting of activated carbon, zeolite, and porous ceramics.

13. The method according to claim 8,
wherein the base material is made of glass, ceramics, resin, metal, paper, fiber, or wood.

14. The method according to claim 8,
wherein a content of the binder component in the coating material is in a range of from 5 to 95 mass %.

15. The method according to claim 8,
wherein the inorganic binder comprises at least one selected from the group consisting of a product obtained through decomposition of a hydrolytic silicon compound, an organopolysiloxane compound, a polycondensate of the organopolysiloxane compound, silica, water glass, phosphate, metal oxide, cement, gypsum, lime, and frit.

16. The method according to claim 8,
wherein the organic binder comprises at least one selected from the group consisting of fluorine-based resin, silicone resin, acrylic resin, epoxy resin, polyether resin, melamine resin, urethane resin, and alkyd resin.

17. The method according to claim 8,
wherein the photocatalytic film is formed on a surface of a building material, an interior material, a home electric appliance, or a filter used in a home electric appliance.

\* \* \* \* \*